United States Patent [19]

Taillie

[11] Patent Number: 5,745,812
[45] Date of Patent: Apr. 28, 1998

[54] METHOD AND APPARATUS FOR RECORDING DATA ON PHOTOGRAPHIC FILM IN A LOW COST CAMERA

[75] Inventor: Paul Lee Taillie, Rochester, N.Y.

[73] Assignee: Eastman Kodak Company, Rochester, N.Y.

[21] Appl. No.: 632,989

[22] Filed: Apr. 16, 1996

[51] Int. Cl.$^6$ .................................................. G03B 17/24
[52] U.S. Cl. ........................................ 396/319; 396/310
[58] Field of Search ...................... 354/106, 76; 360/47; 396/310, 319, 326

[56] References Cited

U.S. PATENT DOCUMENTS

| | | | |
|---|---|---|---|
| 4,977,419 | 12/1990 | Wash et al. | 354/76 |
| 5,184,161 | 2/1993 | Egawa | 396/319 |
| 5,187,511 | 2/1993 | Amano | 354/106 |
| 5,204,708 | 4/1993 | Whitfield et al. | 354/105 |
| 5,502,527 | 3/1996 | Kazami et al. | 354/106 |

*Primary Examiner*—Safet Metjahic
*Assistant Examiner*—Michael Dalakis
*Attorney, Agent, or Firm*—Francis H. Boos, Jr.

[57] ABSTRACT

A photographic camera is provided with magnetic recording means including a frequency selection circuit responsive to a controller to iteratively record data on a magnetic recording layer formed on photographic film with each iteration being recorded at a different recording frequency. Suitable selection of recording frequencies for a range of expected film speeds will result in a predetermined number of recorded iterations for which respective bit densities and cumulative recorded track length will fall within predetermined acceptable limits established for reliable reading of the data by subsequent data read circuits.

5 Claims, 3 Drawing Sheets

| Write Frequency, k-bits/s | | | Film Velocity | Written Bit Densities b/mm | | | Track Lengths of Data Blocks, mm | | | | |
|---|---|---|---|---|---|---|---|---|---|---|---|
| Block 1 | Block 2 | Block 3 | mm/s | Block 1 | Block 2 | Block 3 | Block 1 | Block 2 | Block 3 | Total | Block 1+2 |
| 2.50 | 1.70 | 1.40 | 60  | 41.7 | 28.3 | 23.3 | 3.1 | 4.5  | 5.5  | 13.3 | 7.7  |
| 2.50 | 1.70 | 1.40 | 70  | 35.7 | 24.3 | 20.0 | 3.6 | 5.3  | 6.4  | 15.6 | 9.0  |
| 2.50 | 1.70 | 1.40 | 80  | 31.3 | 21.3 | 17.5 | 4.1 | 6.0  | 7.3  | 17.8 | 10.2 |
| 2.50 | 1.70 | 1.40 | 90  | 27.8 | 18.9 | 15.6 | 4.6 | 6.8  | 8.2  | 20.0 | 11.5 |
| 2.50 | 1.70 | 1.40 | 100 | 25.0 | 17.0 | 14.0 | 5.1 | 7.5  | 9.1  | 22.2 | 12.8 |
| 2.50 | 1.70 | 1.40 | 110 | 22.7 | 15.5 | 12.7 | 5.6 | 8.3  | 10.1 | 24.5 | 14.1 |
| 2.50 | 1.70 | 1.40 | 120 | 20.8 | 14.2 | 11.7 | 6.1 | 9.0  | 11.0 | 26.7 | 15.4 |
| 2.50 | 1.70 | 1.40 | 130 | 19.2 | 13.1 | 10.8 | 6.7 | 9.8  | 11.9 | 28.9 | 16.7 |
| 2.50 | 1.70 | 1.40 | 140 | 17.9 | 12.1 | 10.0 | 7.2 | 10.5 | 12.8 | 31.1 | 17.9 |
| 2.50 | 1.70 | 1.40 | 150 | 16.7 | 11.3 | 9.3  | 7.7 | 11.3 | 13.7 | 33.4 | 19.2 |
| 2.50 | 1.70 | 1.40 | 160 | 15.6 | 10.6 | 8.8  | 8.2 | 12.0 | 14.6 | 35.6 | 20.5 |
| 2.50 | 1.70 | 1.40 | 170 | 14.7 | 10.0 | 8.2  | 8.7 | 12.8 | 15.5 | 37.8 | 21.8 |

FIG. 3

METHOD AND APPARATUS FOR RECORDING DATA ON PHOTOGRAPHIC FILM IN A LOW COST CAMERA

FIELD OF THE INVENTION

The invention relates to the field of photographic cameras. More specifically it relates to the and more particularly to the magnetic recording of digital data bits on elongated data tracks in a magnetic layer formed on photographic film in the camera.

BACKGROUND OF THE INVENTION

The recording in a photographic camera of digital data on a magnetic layer formed on the photographic film has been described in the patent literature, an example of which is found in commonly assigned U.S. Pat. No. 4,977,415, the disclosure of which is incorporated herein by reference. In brief, a photographic film is coated on the opposite side from the photographic emulsion with a thin, virtually transparent coating of magnetic recording material. The camera is provided with a magnetic write head which is driven by a magnetic data drive circuit to serially record digital data in elongated tracks on the film, preferably along the margins of the film adjacent each exposed image frame. In a currently proposed camera system, the data is recorded in the form of one or more data blocks, each of which is delimited by start and end sentinels and contains one or more data fields comprising predefined codes representing the specific photographic data being recorded.

Due the fact that the magnetic layer is relatively thin, as compared to conventional audio or video tape, to ensure the necessary transparency, the recorded signal level is generally quite low. To improve the reliability of reading such low level signals, U.S. Pat. No. 5,187,511 discloses a camera data recording system in which the same data is recorded at the image frame a plurality of times. In this way, if an error occurs in one of the data packets, the correct data can be read from the remaining packets. Typically, the majority rule is used to determine the correct data.

Standards for maximum and minimum recorded bit densities are established to ensure readability of the data from the thin magnetic material and also to ensure that the necessary data is recorded within the available length of the data track, typically a fixed portion of the total span of an image frame region. Bit density of the recorded data is, in part, a function of the film transport speed which can vary depending on such factors as battery voltage level and ambient temperature conditions. It is known to provide data recording cameras with film transport speed sensing arrangements used to set a data recording frequency that effects a recorded bit density meeting standards established for the camera system. However, such speed sensing arrangements and associated computational processing equipment add to the cost of the camera and are not suitable for use in a low cost cameras.

SUMMARY OF THE INVENTION

In accordance with the invention, there is provided a method of recording digital data blocks on photographic film in a camera, the data blocks being recorded in elongated tracks during a predetermined length of transport of the film, the method characterized by iterative recording of the same data blocks with each of the data blocks being recorded at a different frequency. In the camera, the film is transported at an indeterminate velocity which is dependent, at least in part, on camera battery operating voltage and on ambient temperature conditions. Depending on actual film velocity during recording, the data blocks are capable of being recorded at bit densities and over resultant track lengths that fall outside a predetermined window of acceptable bit densities and over track lengths that may exceed a predetermined maximum track length. In the preferred form of the invention, the same data blocks are recorded at least three times within the span of an image frame region and the data recording frequency for each recorded data block is such that at least two of the recorded data blocks fall within the acceptable window of bit densities and the predetermined maximum track length. With such an arrangement, it is feasible to achieve reliable reading of the iteratively recorded data without the need for costly film transport speed sensing devices and film speed computational apparatus.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 3 is a chart demonstrating the effect of the invention on recorded bit densities and total track lengths at different film transport speeds.

DETAILED DESCRIPTION OF THE INVENTION

Figure 1:
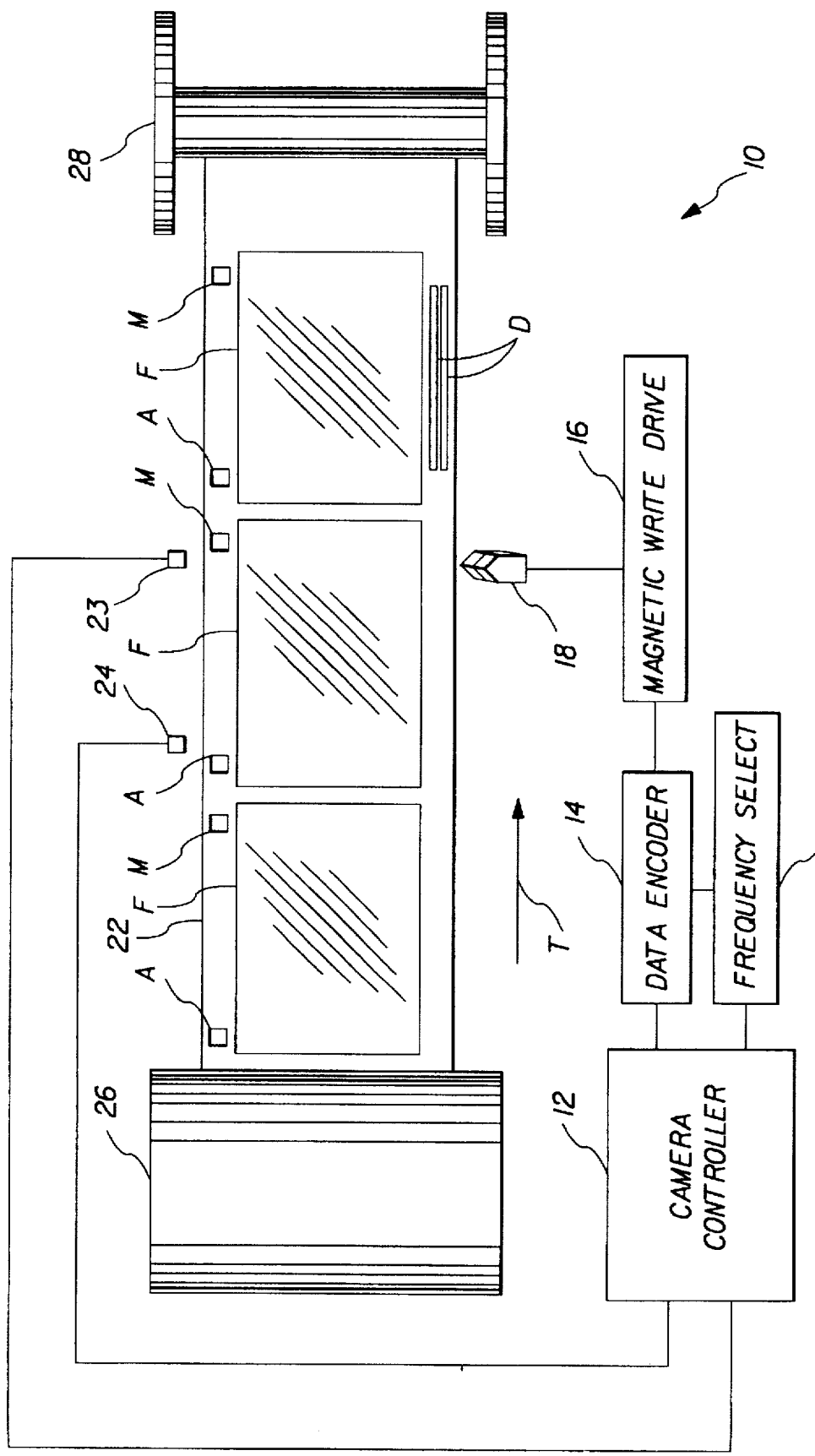
FIG. 1 is a functional block diagram of portions a photographic camera embodying digital recording apparatus of the present invention.

Referring to FIG. 1, there are shown portions of a camera 10 relevant to the present invention which include a camera controller 12, data encoder 14 and magnetic write drive circuit 16 and magnetic write head 18. A frequency select circuit 20 operates under the control of controller 12 to determine the frequency at which data from controller 12 is encoded for writing onto a virtually magnetic layer formed on film 22. Film 22 is provided with repeating pairs of spaced apart perforations M and A which defined regularly spaced image frame regions F. A first perforation sensor switch 23 is coupled to controller 12 and serves to generate perforation sensing signals from the passage of anticipation perforation A and metering perforation M which are used by controller 12 to meter the film advance from in the direction of arrow T from film cartridge 26 to takeup spool 28 so as to accurately position, in known manner, each successive frame region at the frame exposure gate (not shown) in the camera. A second perforation switch 24 is also coupled to controller 12 and is operative each time the film is advanced following a picture taking event, to generate a sense signal from anticipation perforation A which causes controller 12 to initiate the magnetic recording of digital data in elongated data tracks D by magnetic write head 18. The maximum recordable length of data tracks D is established as a standard. In the proposed system, the maximum length is established at 22 mm. In the simplified camera arrangement recording can be terminated by controller 12 when sensor switch 23 senses the arrival of the trailing edge of the anticipation perforation A associated with the frame for which the data is being recorded. Alternatively, recording may be allowed to continue beyond the 22 mm limit. However, any recording beyond this limit may not be read due to the fact that subsequent reading equipment may be limited to reading only the standard track length, i.e. 22 mm.

Film transport speed in a camera can vary significantly due to changing battery operating voltage levels and ambient temperature conditions resulting in significant variations in recorded bit density. In the proposed camera system, a window of acceptable recorded bit densities is established to assure compatibility with photofinishing equipment. Currently, such standards call for a window of 5–40 bits/mm. To provide a further cushion, a narrower window of 5–30 mm is assumed for the purposes of the present invention. In more expensive cameras, sensor 24 would preferably comprise an opto-sensor and its output would be coupled to a microprocessor which would be programmed to calculate the transport speed of the advancing film from the measured time width of perforation A so as to hold the data recording frequency at values that would result in recorded bit densities falling within the window of acceptable bit densities irrespective of the actual film transport speed during recording. In low cost cameras, the use of microprocessors and speed sensing capability is inappropriate.

Figure 2:
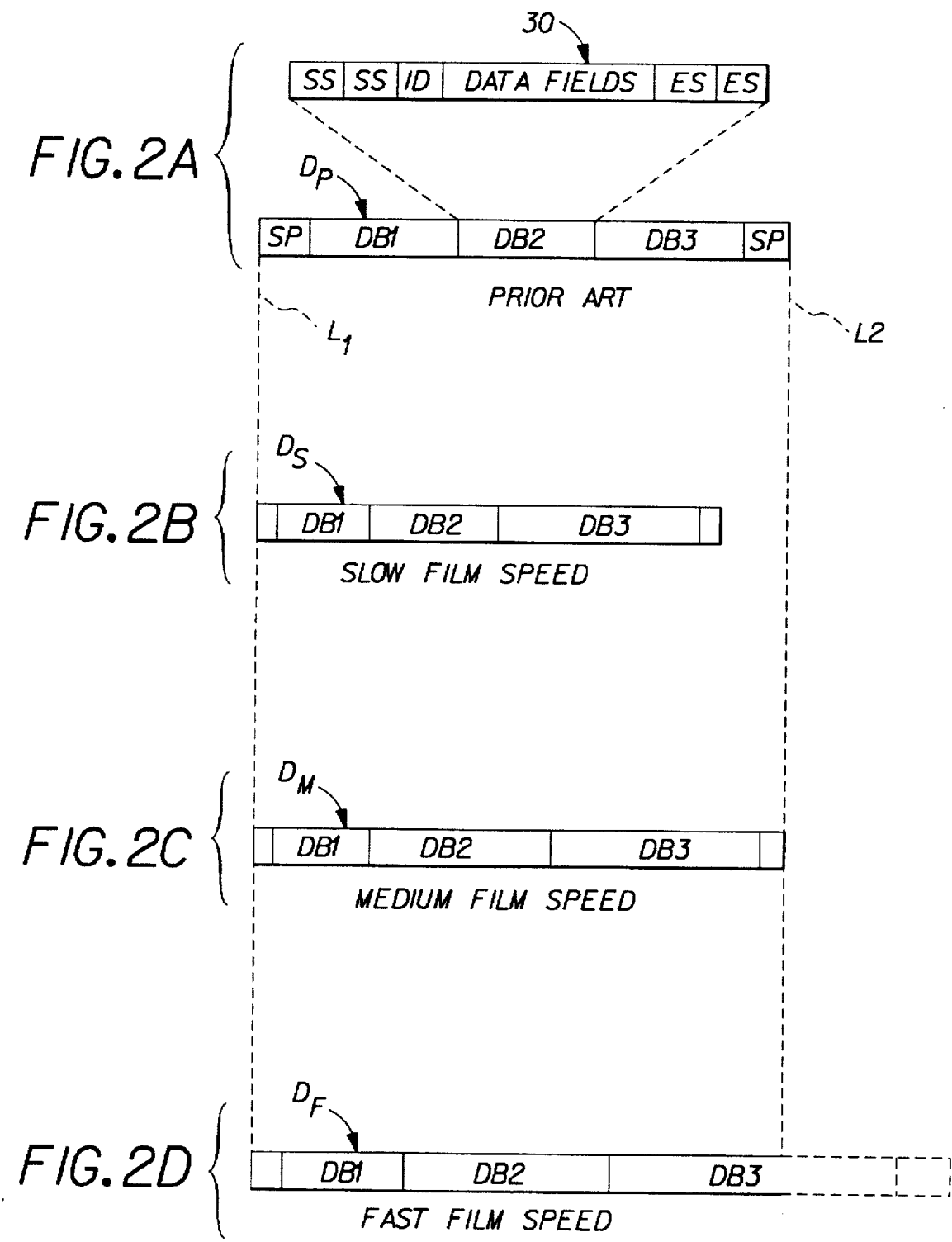
FIG. 2(a)–2(d) are diagrammatic illustrations of data blocks recorded in accordance with the invention at different film transport speeds

FIG. 2 illustrates, in diagrammatic form, data tracks D recorded on the film magnetic layer. As shown in FIG. 2(a), data track $D_p$ is recorded at a single selected frequency in accordance with prior art teachings, where the frequency may be selected in response to an appropriate speed sensing devices in the camera to cause the track to fit within the maximum allowable track length represented by dotted lines L1 and L2. Track $D_p$ includes synchronizing pulse segments SP at the beginning and end of the track. The initial synch pulse segment is followed by a recorded data block DB1 which may be repeated as data blocks DB2 and DB3 to provide iteratively recorded data blocks for enhanced reading reliability. The content of a representative data block is shown at 30 as starting with two one-byte start sentinels SS, followed by a one-byte ID code and ending with two one-byte end sentinels ES. Between the ID code and end sentinels ES are recorded the data fields which, in a representative embodiment consists of eleven bytes of recorded data representing such data as date and time, and photographic conditions such as exposure value, print format, flash fire, artificial illuminant flag, magnification and the like. Assuming iterative recording as described in the aforementioned '511 patent, the content of data blocks DB1 and DB3 would be identical to data block DB2.

FIGS. 2(b)–2(d) illustrate the modified recording scheme of the present invention intended for use in a camera which does not have film speed sensing devices or the computational capability of setting the recording frequency to match the film speed. Specifically, in accordance with the present invention, frequency select circuit 20 is controlled by 12 to record each iteration of the recorded data blocks at a different predetermined frequency such that, irrespective of the film velocity, a predetermined number of the data blocks, at least two of the three data blocks in the illustrated embodiment, are recorded at bit densities that come within an acceptable range of recorded bit densities set by system standards and also fit with the track limits of L1, L2. FIG. 2(b) illustrates a data track recorded at a relatively slow film speed in which the first data block is recorded at the highest of the three recorded frequencies resulting in a high bit density that is beyond the upper limit of the acceptable range, i.e. beyond 30 bits/mm in the exemplary embodiment. However, the progressively lower frequencies at which data blocks DB2 and DB3 are recorded result in bit densities that are within the acceptable range and may be read successfully by subsequent data reading circuits. FIG. 2(c) illustrates the effect of recording at a moderate film speed where the higher recording frequency for data block DB1 may again result in too high a bit density while the progressively lower recording frequencies of data blocks DB2 and DB3 result in acceptable recorded bit densities and still fit within the track length L1–L2. FIG. 2(d) illustrates the effect of high film speeds on the recording. The higher film speed causes lower recorded bit densities which would cause the length of the third recorded data block DB3 to extend beyond the end limit L2 of the allowable track length. Since recording is terminated at L2, the result is that data block DB3 is truncated. However, the first two data blocks DB1 and DB2 are at bit densities that are within the acceptable bit density range and are therefore readable by subsequent reading circuits.

The synchronizing pulse segments may be recorded at an arbitrary intermediate frequency independent of the frequencies chosen for the data blocks. However, if they are each recorded at the same frequency of the adjacent data block, then, the leading segment would be lost in the examples of FIGS. 2(b) and 2(c) and the trailing segment would be lost in the FIG. 2(d) example. In all cases, however, the segment at the opposite end of the track would be available in an acceptable bit density.

Referring to the chart of FIG. 3, there is shown the effect on track lengths and recorded bit densities resulting from the use of three predetermined frequencies, 2.5 kbits/sec (for DB1), 1.7 kbits/sec (for DB2) and 1.4 kbits/sec (for DB3) at different film speeds ranging from 60 to 170 mm/sec. As seen from the blocks set off by heavy outlines, in all cases there are at least two recorded data blocks available that simultaneously satisfy the limitations on both recorded bit density (5–30 bits/mm) and maximum track length of 22 mm. The effect of the eight synchronizing pulses is added to the individual block length in computing the values in the "Total" column. It will be appreciated that the values for recording frequency and film speed shown in the FIG. 3 chart are representative of a specific camera recording system and that other values may be employed to meet different bit density and track length limitations.

The invention has been described with reference to a preferred embodiment. However, it will be appreciated that variations and modifications can be effected by a person of ordinary skill in the art without departing from the scope of the invention.

PARTS LIST 10 camera
12 camera controller
14 data encoder
16 magnetic write drive circuit
18 magnetic write head
20 frequency select circuit
22 film metering sensor switch
24 film anticipation sensor switch
26 film cartridge
28 film takeup spool
T film advance direction
F image frame regions
M film metering perforation
A film anticipation perforation

What is claimed is:

1. A method of recording digital data blocks on photographic film in a camera, the data blocks being recorded in elongated tracks during a predetermined length of transport of the film at a film transport velocity falling within a range of possible film transport velocities, the method comprising the steps of iterative recording of the same data block in an elongated track and recording each same data block in said track at a respectively different data recording frequency each time independent of film transport velocity.

2. The method of claim 1 wherein said iterative recording step includes recording of said data blocks within predetermined track lengths of an image frame area during transport of the film to a next successive image frame area; and further includes recording each data block at least three times during said film transport at a different frequency each time.

3. The method of claim 2 wherein the film is transported at an indeterminate velocity dependent on camera battery operating voltage and ambient temperature conditions; said recorded data blocks are capable of being recorded, depending on actual film transport velocity during recording, at bit densities that fall outside a predetermined window of acceptable bit densities and over a track length that exceeds a predetermined maximum track length; the method including the step of recording each recorded data block at a different data recording frequency selected such that at least two of the recorded data blocks fall both within said acceptable window of bit densities and the predetermined maximum track length.

4. Apparatus for recording digital data as data blocks on photographic film in a camera comprising:

means for transporting film in the camera at a film transport velocity falling within a range of possible film transport velocities dependent on camera operating characteristics and ambient conditions;

recording means for iteratively recording the same data block in an elongated track on the film during said transport of the film; and frequency setting means for setting a different data recording frequency independent of film transport velocity for each respective iterated recording of the same data block within said elongated track.

5. Apparatus according to claim 4, wherein said data blocks are recordable during a predetermined length of film transport at bit densities and over track lengths which, dependent on actual transport velocity of the film, are capable of falling outside of an acceptable window of bit densities or over a track length that exceeds a predetermined maximum track length;

said recording means is adapted to record the same data blocks at least three times during said film transport; and said different recording frequencies are such that at least two of said recorded same data blocks fall both within said acceptable window of bit densities and said predetermined maximum track length.

* * * * *

UNITED STATES PATENT AND TRADEMARK OFFICE
CERTIFICATE OF CORRECTION

PATENT : 5,745,812

DATED : April 28, 1998

INVENTOR(S) : Paul L. Taillie

It is certified that error appears in the above-identified patent and that said Letters Patent is hereby corrected as shown below:

Title page, insert the following:
--[60] Provisional application No. 60/003,544, filed Sep. 11, 1995.--.

Column 1, line 4, insert the following:
--CROSS REFERENCE TO RELATED APPLICATION
Reference is made to and priority claimed from U.S. provisional application Ser. No. 60/003,544, filed Sep. 11, 1995, entitled METHOD AND APPARATUS FOR RECORDING DATA ON PHOTOGRAPHIC FILM IN A LOW COST CAMERA.--.

Signed and Sealed this

Eleventh Day of August 1998

*Attest:*

BRUCE LEHMAN

*Attesting Officer*     *Commissioner of Patents and Trademarks*